United States Patent [19]

Haruta et al.

[11] Patent Number: 5,540,764
[45] Date of Patent: Jul. 30, 1996

[54] INK, AND INK-JET RECORDING METHOD AND INSTRUMENT USING THE SAME

[75] Inventors: Masahiro Haruta, Tokyo; Shoji Koike, Yokohama; Koromo Shirota, Kawasaki; Tomoya Yamamoto, Kawasaki; Mariko Suzuki, Kawasaki, all of Japan

[73] Assignee: Canon Kabushiki Kaisha, Tokyo, Japan

[21] Appl. No.: 380,619

[22] Filed: Jan. 30, 1995

[51] Int. Cl.[6] ............................................. C09D 11/02
[52] U.S. Cl. .................... 106/20 R; 106/20 D; 106/22 R
[58] Field of Search .......................... 106/22 R, 20 R, 106/20 D

[56] References Cited

U.S. PATENT DOCUMENTS

| | | | |
|---|---|---|---|
| 4,290,812 | 9/1981 | Loock | 106/22 H |
| 4,585,484 | 4/1985 | Haruta et al. | 106/22 |
| 4,790,880 | 12/1988 | Miller | 106/20 D |
| 4,840,674 | 6/1989 | Schwarz | 106/20 R |
| 5,061,316 | 10/1991 | Moffatt | 106/22 H |
| 5,169,436 | 12/1992 | Matrick | 106/22 R |
| 5,190,581 | 3/1993 | Fukushima et al. | 106/20 D |
| 5,220,347 | 6/1993 | Fukushima et al. | 346/1.1 |

FOREIGN PATENT DOCUMENTS

| | | |
|---|---|---|
| 54-59936 | 5/1979 | Japan. |
| 56-57862 | 5/1981 | Japan. |
| 55-29546 | 3/1990 | Japan. |

*Primary Examiner*—Helene Klemanski
*Attorney, Agent, or Firm*—Fitzpatrick, Cella, Harper & Scinto

[57] ABSTRACT

Disclosed herein is an ink comprising a coloring material and a liquid medium dissolving or dispersing the coloring material therein, wherein the ink comprises a compound represented by the general formula

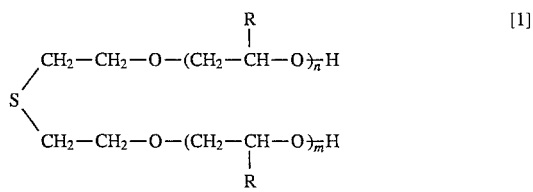

wherein R denotes H or $CH_3$, n is an integer of 1 to 3, m is an integer of 1 to 3, and n+m is within a range of from 1 to 4, or bis(2-hydroxyethyl)sulfone.

51 Claims, 3 Drawing Sheets

INK, AND INK-JET RECORDING METHOD AND INSTRUMENT USING THE SAME

BACKGROUND OF THE INVENTION

1. Field of the Invention

The present invention relates to an ink, and an ink-jet recording method and instruments using the ink. In particular, the present invention relates to an ink which permits highly fine and high-image quality recording or printing on non-coated paper such as paper for copying, paper for reporting, bond paper and continuous business forms, i.e., so-called plain paper, which are commonly used in offices and homes, to say nothing of coated paper specially prepared for ink-jet recording, and on cloth, an ink-jet recording method using such an ink, and a recording unit, ink-jet recording apparatus and ink cartridge containing such an ink therein.

2. Related Background Art

Inks of various compositions have been hitherto reported with respect to inks for ink-jet recording. In particular, in recent years, detailed research and development have been made from various aspects such as composition and physical properties of inks with a view toward conducting good recording or printing on plain paper such as paper for copying, paper for reporting, notepaper and letter paper, which are commonly used in offices, and on cloth.

With respect to ink-jet recording methods, those of very different systems have heretofore been reported, including a system in which charged ink droplets are continuously generated to use a part of them in recording, a system in which signals are applied to a recording head having a piezoelectric element to generate droplets of a recording liquid according to the signals, thereby conducting recording, and a system in which thermal energy according to recording signals is applied to a recording liquid in a chamber of a recording head to generate droplets of the recording liquid by the thermal energy, thereby conducting recording.

In particular, a system of a type wherein an ink is ejected by the bubbling phenomenon of the ink caused by thermal energy as described in Japanese Patent Application Laid-Open No. 54-59936 has recently attracted attention in that the high integration and high densification of nozzles can be realized with ease. However, since the system makes good use of the bubbling, which is a phenomenon different from those of other systems, more stringent conditions are required of the inks to be used.

As preferable conditions required of inks used in such a system, may be mentioned the following conditions:

(1) having good frequency responsiveness, whereby ink droplets are ejected stably at all times from minute ejection orifices without causing clogging, and in particular, having good responsiveness of bubbling to thermal energy;

(2) even when allowed to stand without capping a head during the suspension of recording, being able to be stably ejected from just after the resumption of recording, namely, being unlikely to dry in the vicinity of ejection orifices and hence causing no clogging;

(3) providing high-quality images free of undefined or irregular feathering and/or bleeding, in particular, on plain paper and cloth;

(4) having quick fixing ability (good drying ability) on plain paper and cloth;

(5) having good storage stability and being able to keep good ink performances over a long period of time, and moreover causing neither disconnection nor deposition of foreign matter on a heating head, in particular, in the case of recording by a system making good use of thermal energy; and (6) being highly safe from toxicity, inflammability and the like.

Many proposals have heretofore been made with a view toward meeting such requirements. For example, inks generally contain a high-boiling organic solvent such as glycol for the purpose of preventing drying and clogging, and the like. When such an ink has been used to conduct recording on plain paper high in sizing degree, there have been problems in that the ink does not readily penetrate into the interior of the paper and an area on which a record has been made does not dry well, so that when such an area is touched with a finger, the finger is smeared with the ink, or the unrecorded area of the paper is stained due to rub-off of the characters recorded. Besides, when printing has been conducted on a cloth with such inks, such problems that marked bleeding occurs and color depth is also low, resulting in the formation of dull images, have occurred.

Under such circumstances, in order to enhance the penetrability of an ink into the interior of the paper, Japanese Patent Application Laid-Open No. 55-29546 has proposed a method in which a great amount of a surfactant is added to the ink. In this case, however, feathering has occurred to an extremely great extent on some kind of paper. In the case where such an ink is charged into a head for ink-jet, there have been recognized such problems such as the ink receding from an orifice surface, resulting in a failure in ejection of the ink, or the whole of the orifice surface is wetted to the contrary, also resulting in failure in ejection of the ink, though it varies with the structural conditions of the head.

It has also been proposed in Japanese Patent Application Laid-Open No. 56-57862 to make the pH of an ink strongly alkaline. This method, however, involves such drawbacks that the ink is harmful when touched with fingers, and poor results may be obtained in view of both resistance to feathering and fixing ability against paper using a certain kind of size, for example, neutralized paper.

Besides the above proposals, various improvements have been attempted to date. However, there has not yet been known under the circumstances any ink which can sufficiently solve all the problems of the feathering, drying ability and clogging. It is important to design an ink having a performance with good frequency responsiveness in addition to the above properties. Such a subject is however extremely difficult to attain.

SUMMARY OF THE INVENTION

It is accordingly an object of the present invention to provide an ink which is good in frequency responsiveness, in particular, responsiveness of bubbling to thermal energy according to frequency, and can solve the problems of feathering and slow drying, which occur when conducting recording or printing on non-coated paper such as paper for copying, paper for reporting, notepaper and letter paper, i.e., so-called plain paper, which are commonly used in offices, and on cloth, and an ink-jet recording method and instruments using such an ink.

Another object of the present invention is to provide an ink having a high safety even when used in offices and homes.

A further object of the present invention is to provide an ink which is not liable to cause clogging at orifices of an ink-jet recording head and hence has excellent reliability, and instruments using such an ink.

The above objects can be achieved by the present invention described below.

According to the present invention, there is thus provided an ink comprising a coloring material and a liquid medium dissolving or dispersing the coloring material therein, wherein the ink comprises a compound represented by the general formula

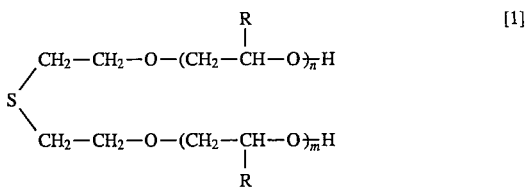

[1]

wherein R denotes H or $CH_3$, n is an integer of 1 to 3, m is an integer of 1 to 3, and n+m is within a range of from 1 to 4, or bis(2-hydroxyethyl)sulfone.

According to the present invention, there is also provided an ink-jet recording method comprising ejecting droplets of an ink out of an orifice in accordance with a recording signal to conduct recording on a recording medium, wherein the ink described above is used.

According to the present invention, there is further provided a recording unit comprising an ink container portion with an ink held therein and a head from which the ink is ejected in the form of ink droplets, wherein said ink is the ink described above.

According to the present invention, there is still further provided an ink cartridge comprising an ink container portion with an ink held therein, wherein said ink is the ink described above.

According to the present invention, there is yet still further provided an ink-jet recording apparatus comprising a recording unit having an ink container portion with an ink held therein and a head from which the ink is ejected in the form of ink droplets, wherein said ink is the ink described above.

According to the present invention, there is yet still further provided an ink-jet recording apparatus comprising a recording head from which an ink is ejected in the form of ink droplets, an ink cartridge having an ink container portion with the ink held therein, and an ink feeder for feeding the ink from the ink cartridge to the recording head, wherein said ink is the ink described above.

DESCRIPTION OF THE PREFERRED EMBODIMENTS

Figure 1:
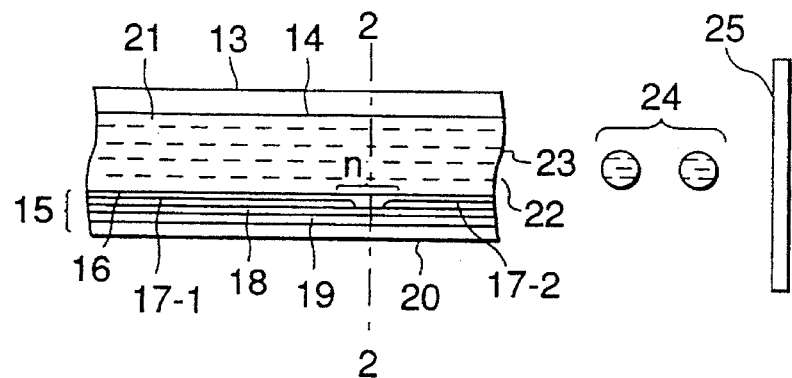
FIG. 1 is a longitudinal cross-sectional view of a head of an ink-jet recording apparatus.

The present inventors have carried out an extensive investigation on various types of ink compositions with good reliability, which are suitable for recording conducted by ejecting an ink out of an orifice, in particular, recording conducted by ejecting an ink by the bubbling phenomenon of the ink caused by thermal energy, which show improved resistance to feathering, drying ability and penetrability of ink on paper and cloth, and are not liable to cause clogging at orifices of an ink-jet recording head. As a result, it has been found that an ink comprising, as a liquid medium, a compound represented by the general formula [1] or bis(2-hydroxyethyl)sulfone together with water is well balanced between feathering and penetrability, and is particularly good in anti-clogging, properties thus leading to completion of the present invention.

According to the knowledge of the present inventors, polyethylene glycols and glycerol are used as conventional anti-clogging agents. In particular, glycerol is a particularly preferable anti-clogging agent because clogging can be prevented by adding it in a relatively small amount, and it is not liable to cause feathering of ink on paper. However, glycerol involves a drawback that its poor wettability to a size present in paper results in an ink poor in the drying ability and penetrability on some kind of paper.

On the other hand, the compound represented by the general formula [1] or bis(2-hydroxyethyl)sulfone useful in the practice of the present invention has the same anti-clogging effect as glycerol and moreover is well balanced between feathering and penetrability of the ink. The reason is considered to be as follows. Such a compound is low in vapor pressure and excellent in dissolution or dispersion property of coloring matter, so that the anti-clogging effect is brought about. In addition, since it has a sulfur atom or a $SO_2$ group in its molecule, its wettability to cellulose fibers of paper and cloth, sizes in paper, and cloths composed of hydrophobic fibers is good, so that the penetrability of the ink into paper or cloth is improved to a marked extent.

On the other hand, the responsiveness to frequency of the ink becomes particularly good when the content of the compound represented by the general formula [1] or bis(2-hydroxyethyl)sulfone in the ink is 0.1 to 30% by weight, and the content of water in the ink is 50 to 95% by weight. The reason is considered to be that the physical properties and wettability to individual parts in the interior of a nozzle of the ink obtained by mixing the components in the above-described proportion are optimum for the recording method according to the ejection of the ink.

The individual components of the ink according to the present invention will hereinafter be described.

As examples of the compound represented by the general formula [1], which is useful in the practice of the present invention and is principal feature of the present invention, may be mentioned the following compounds.

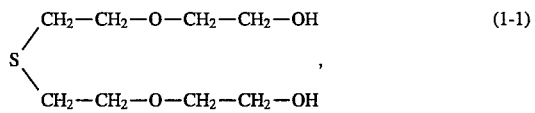

(1-1)

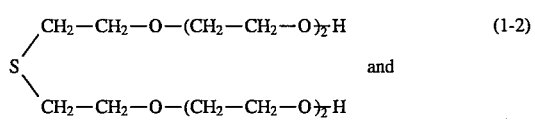

and (1-2)

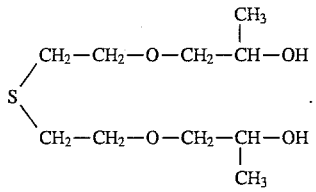

(1-3)

The addition of the compound represented by the general formula [1] into the ink may be performed either by itself or in any mixed system. The compound [1] is preferably used in a proportion of from 0.1 to 30% by weight, more preferably from 0.1 to 25% by weight, most preferably from 1 to 20% by weight though it varies with the coloring matter used, other liquid medium components used in combination with this compound, and the like.

If the content is lower than 0.1% by weight, its anti-clogging effect can not be sufficiently exhibited. If the content exceeds 30% by weight on the other hand, a problem tends to arise from the viewpoint of the penetrability and resistance to feathering of the resulting ink.

On the other hand, the addition of bis(2-hydroxyethyl)sulfone into the ink may be performed either by itself or in any mixed system. This compound is preferably used in a proportion of from 0.1 to 30% by weight, more preferably from 1 to 25% by weight, most preferably 20% by weight though it varies with the coloring matter used, other liquid medium components used in combination with this compound, and the like.

If the content is lower than 0.1% by weight, its anti-clogging effect can not be sufficiently exhibited. If the content exceeds 30% by weight on the other hand, a problem tends to arise from the viewpoint of the penetrability and resistance to feathering of the resulting ink.

Examples of the coloring matter making up the ink according to the present invention include direct dyes, acid dyes, food dyes, basic dyes, reactive dyes, disperse dyes, vat dyes, soluble vat dyes, reactive disperse dyes, oil dyes and various pigments. Of these, water-soluble dyes such as the direct dyes, acid dyes and reactive dyes are particularly preferred from the viewpoint of the performance of the resulting ink.

Water-insoluble dyes may preferably be used for textile printing.

The water-insoluble dyes used in the present invention are dyes or pigments which are not absolutely dissolved or scarcely dissolved in water. Disperse dyes, reactive disperse dyes, oil dyes and various pigments are preferred from the viewpoint of the performance of the resulting ink. Of these, the disperse dyes are particularly preferred. The reason why the disperse dyes are particularly preferred is that in particular, bis(2-hydroxyethyl)sulfone among the compounds described above has an effect of inhibiting the secondary aggregation of a dye dispersed in the form of fine particles, thereby improving the dispersion stability of the ink.

The content of these coloring matters may be determined depending upon the kinds of the liquid medium components, properties required of the ink, and the like. However, if used together with the compound represented by the general formula [1], they may be generally contained in a proportion of from 0.2 to 25% by weight, preferably from 0.5 to 20% by weight, more preferably from 1 to 15% by weight based on the total weight of the ink. On the other hand, if used together with bis(2-hydroxyethyl)sulfone, they may be generally contained in a proportion of from 0.2 to 20% by weight, preferably from 0.5 to 20% by weight, more preferably from 1 to 10% by weight based on the total weight of the ink.

The content of water in the ink according to the present invention is in a proportion of from 50 to 95% by weight, preferably from 55 to 95% by weight, more preferably from 60 to 95% by weight. If the amount of water is less than 50% by weight, the amount of the organic solvent becomes too much, so that a paper sheet on which printing has been conducted with such an ink may curl, and print quality on plain paper, cloth and the like is deteriorated to a significant extent. If the amount of water exceeds 95% by weight, the resulting ink may be markedly deteriorated in ejection stability from the orifice of a nozzle in some cases.

Although the essential components of the ink according to the present invention are as described above, organic solvents commonly used in conventionally-known inks may also be used in combination. Examples of the organic solvents may include alkyl alcohols having 1 to 5 carbon atoms, such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones and ketone alcohols such as acetone and diacetone alcohol; ethers such as tetrahydrofuran and dioxane; addition polymers of oxyethylene or oxypropylene, such as diethylene glycol, triethylene glycol, tetraethylene glycol, dipropylene glycol, tripropylene glycol, polyethylene glycol and polypropylene glycol; alkylene glycols the alkylene moiety of which has 2 to 6 carbon atoms, such as ethylene glycol, propylene glycol, triethylene glycol, butylene glycol and hexylene glycol; thiodiglycol; 1,2,6-hexanetriol; glycerol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; sulfolane; N-methyl-2-pyrrolidone; 1,3-dimethyl-2-imidazolidinone; and the like.

The content of the water-soluble organic solvent in the ink according to the present invention is generally within a range of from 1 to 49%, preferably from 2 to 40 by weight based on the total weight of the ink.

The liquid media as described above may be used either singly or in any combination thereof if used in combination with the liquid medium according to the present invention. However, the most preferred composition of the liquid medium is a mixed solvent comprising at least one water-soluble, high-boiling solvent, for example, a polyhydric alcohol such as diethylene glycol, triethylene glycol, glycerol or thiodiglycol.

A variety of other additives such as dispersants, surfactants, viscosity modifiers, surface tension modifiers and optical whitening agents may be added as needed.

Specific examples thereof may include viscosity modifiers such as polyvinyl alcohol, cellulose and derivatives thereof, and water-soluble resins; various kinds of surfactants of the cationic, anionic or nonionic type; surface tension modifiers such as diethanolamine and triethanolamine; pH adjustors such as buffers; mildewproofing agents; and the like.

The ink according to the present invention is desirably controlled so as to have, as its own physical properties, a surface tension of 30 to 68 dyne/cm and a viscosity of 15 cP or lower, preferably 10 cP or lower, more preferably 5 cP or lower as measured at 25° C. from the viewpoint of solving the problems of feathering, drying ability and penetrability of the ink when recorded on plain paper, cloth or the like and at the same time, making a good match between the ink and the ink-jet head.

No particular limitation is imposed on the cloth to be printed in accordance with the method of the present invention. However, the ink is suitably used in textile printing on cloths comprising principally polyester, rayon or acrylic fibers.

The ink according to the present invention is suitably used, in particular, in an ink-jet recording system of a type that recording is conducted by ejecting droplets of an ink. However, it goes without saying that the inks may also be used for general-purpose writing utensils.

As preferred methods and apparatus for conducting recording by using the ink according to the present invention, may be mentioned a method and apparatus in which thermal energy corresponding to recording signals is applied to an ink in the interior of a recording head, and ink droplets are generated in accordance with the thermal energy.

Figure 2:
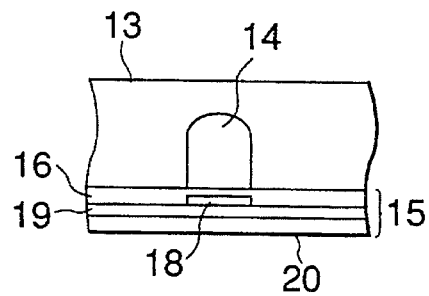
FIG. 2 is a transverse cross-sectional view of the head of the ink-jet recording apparatus.
Figure 3:
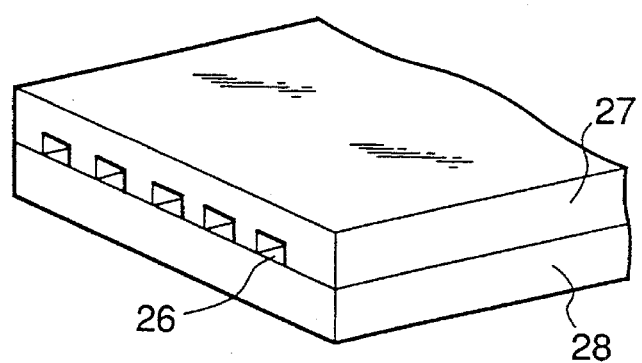
FIG. 3 is a perspective view of the appearance of a multi-head which is an array of such heads as shown in FIG. 1.

Examples of the construction of head, which is a main component of such an apparatus, are illustrated in FIGS. 1, 2 and 3.

A head 13 is formed by bonding a glass, ceramic or plastic plate or the like having a groove 14 through which an ink is passed, to a heating head 15, which is used for thermal recording (the drawing shows a head to which, however, the invention is not limited). The heating head 15 is composed of a protective film 16 made of silicon oxide or the like, aluminum electrodes 17- and 17-2, a heating resistor layer 18 made of nichrome or the like, a heat accumulating layer 19, and a substrate 20 made of alumina or the like having a good heat radiating property.

An ink 21 comes up to an ejection orifice (a minute opening) 22 and forms a meniscus 23 due to a pressure P.

Now, upon application of electric signals to the electrodes 17-1, 17-2, the heating head 15 rapidly generates heat at the region shown by n to form bubbles in the ink 21 which is in contact with this region. The meniscus 23 of the ink is projected by the action of the pressure thus produced, and the ink 21 is ejected from the orifice 22 to a recording medium 25 in the form of recording droplets 24.

FIG. 3 illustrates an appearance of a multi-head composed of an array of a number of heads as shown in FIG. 1. The multi-head is formed by closely bonding a glass plate 27 having a number of channels 26 to a heating head 28 similar to the head as illustrated in FIG. 1.

Incidentally, FIG. 1 is a cross-sectional view of the head 13 taken along the flow path of the ink, and FIG. 2 is a cross-sectional view taken along line 2-2' of FIG. 1.

Figure 4:
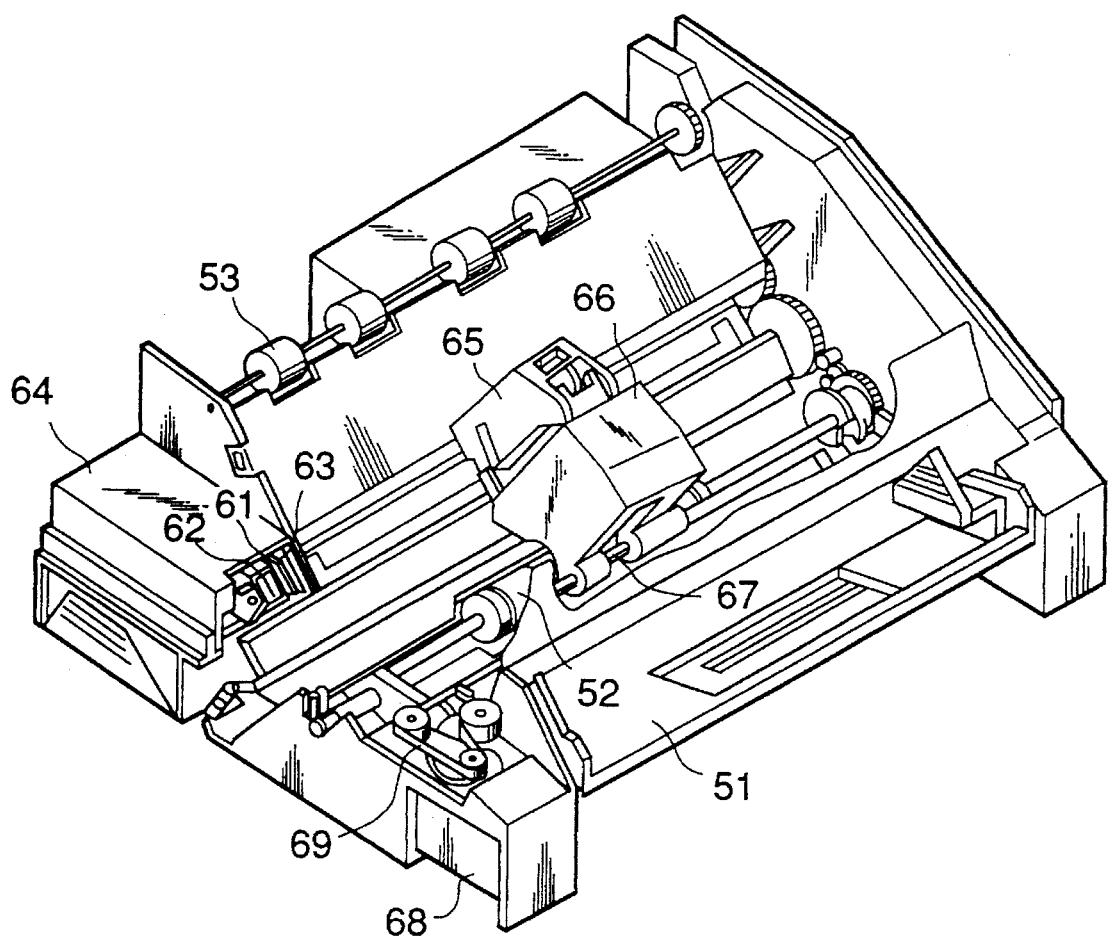
FIG. 4 is a perspective view of an illustrative ink-jet recording apparatus.

FIG. 4 illustrates an example of an ink-jet to recording apparatus in which such a head has been incorporated.

In FIG. 4, reference numeral 61 designates a blade serving as a wiping member, one end of which is a stationary end held by a blade-holding member to form a cantilever. The blade 61 is provided at a position adjacent to a region in which a recording head operates, and in this embodiment, is held in such a form that it protrudes to the course through which the recording head is moved. Reference numeral 62 indicates a cap, which is provided at a home position adjacent to the blade 61, and is so constituted that it moves in a direction perpendicular to a direction in which the recording head is moved and comes into contact with the face of ejection openings to cap it. Reference numeral 63 denotes an ink-absorbing member provided adjoiningly to the blade 61 and, similar to the blade 61, held in such a form that it protrudes to the course through which the recording head is moved. The above-described blade 61, cap 62 and absorbing member 63 constitute an ejection-recovery portion 64, where the blade 61 and the absorbing member 63 remove water, dust and/or the like from the face of the ink-ejecting openings.

Reference numeral 65 designates the recording head having an ejection-energy-generating means and serving to eject the ink onto a recording medium set in an opposing relation with the ejection opening face provided with ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) to a belt 69 driven by a motor 68. Thus, the carriage 66 can be moved along the guide rod 67 and hence, the recording head 65 can be moved from a recording region to a region adjacent thereto.

Reference numerals 51 and 52 denote a paper feeding part from which the recording media are separately inserted, and paper feed rollers driven by a motor (not illustrated), respectively. With such construction, the recording medium is fed to the position opposite to the ejection opening face of the recording head, and discharged from a paper discharge section provided with paper discharge rollers 53 with the progress of recording.

In the above constitution, the cap 62 in the head recovery portion 64 recedes from the course of motion of the recording head 65 when the recording head 65 is returned to its home position, for example, after completion of recording, and the blade 61 remains protruded into the course of motion. As a result, the ejection opening face of the recording head 65 is wiped. When the cap 62 comes into contact with the ejection opening face of the recording head 65 to cap it, the cap 62 is moved so as to protrude into the course of motion of the recording head.

When the recording head 65 is moved from its home position to the position at which recording is started, the cap 62 and the blade 61 are at the same positions as the positions for the wiping as described above. As a result, the ejection opening face of the recording head 65 is also wiped at the time of this movement.

The above movement of the recording head to its home position is made not only when the recording is completed or the recording head is recovered for ejection, but also when the recording head is moved between recording regions for the purpose of recording, during which it is moved to the home position adjacent to each recording region at given intervals, where the ejection opening face is wiped in accordance with this movement.

Figure 5:
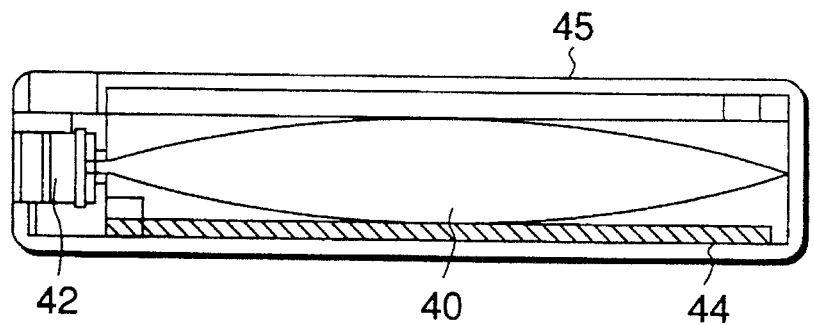
FIG. 5 is a longitudinal cross-sectional view of an ink cartridge.

FIG. 5 illustrates an exemplary ink cartridge in which an ink to be fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving a waste ink. It is preferred in this invention that the ink container portion be formed of a polyolefin, in particular, polyethylene, at its surface which contacts the ink. The ink-jet recording apparatus used in the present invention need not be limited to the apparatus as described above in which the head and the ink cartridge are separately provided. Therefore, a device in which these members are integrally formed as shown in FIG. 6 can also be preferably used.

Figure 6:
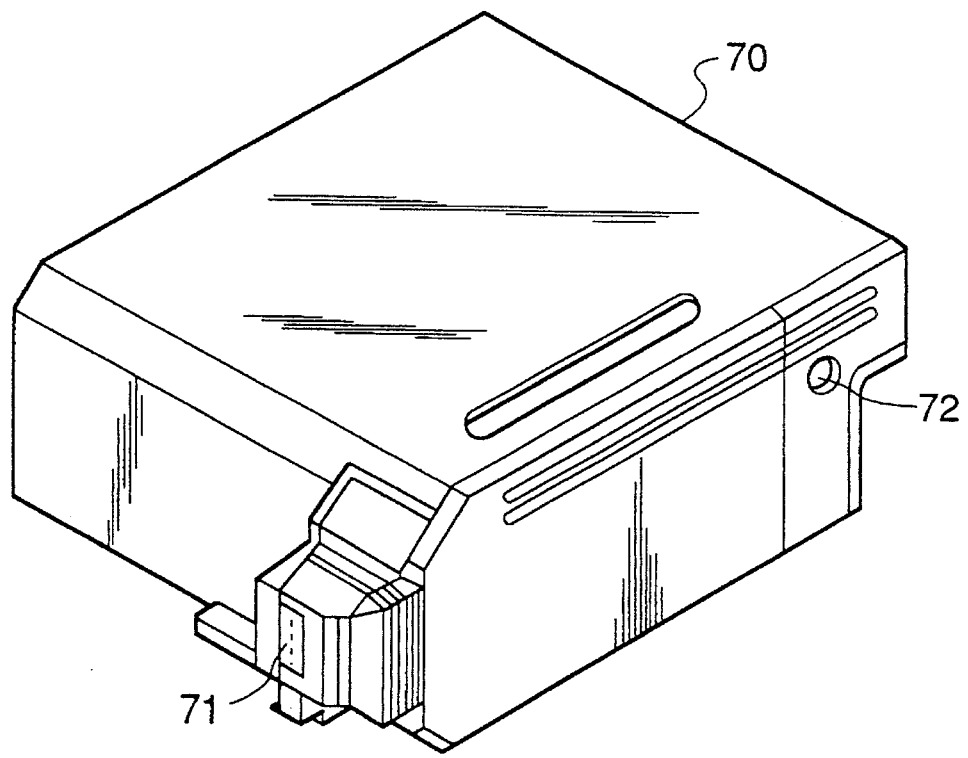
FIG. 6 is a perspective view of a recording unit.

In FIG. 6, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices. In this invention, polyurethane is preferably used as a material for the ink-absorbing member. Reference numeral 72 indicates an air passage for communicating the interior of the recording unit 70 with the atmosphere. This recording unit 70 can be used in place of the recording head shown in FIG. 4, and is detachably installed on the carriage 66.

The present invention will hereinafter be described more specifically by the following Examples. Incidentally, all designations of "part" or "parts" and "%" as will be used in the following examples mean part or parts by weight and % by weight unless expressly noted.

EXAMPLES 1 to 5

After their corresponding components as described below were mixed and stirred for 5 hours, the resultant mixtures were separately adjusted to pH 7.5 with a 0.1% aqueous solution of sodium hydroxide, and then filtered under pressure through a membrane filter (Fluoropore Filter, trade name, product of Sumitomo Electric Industries, Ltd.) having a pore size of 0.22 μm, thereby obtaining Inks A1 to E according to Examples 1 to 5 of the present invention, respectively.

Using each of the thus-obtained Inks A to E, recording was performed on commercially-available paper for copying and bond paper using, as an ink-jet recording apparatus, an Ink-jet Printer BJ130 (trade name, manufactured by Canon Inc.) making good use of a heating element as an ejection-energy source to evaluate the inks in fixing characteristics and percent occurrence of feathering as to the recorded samples thus obtained, clogging tendency upon resumption of printing after temporary suspension, clogging tendency upon resumption of printing after long-term suspension, and frequency responsiveness. The results are shown in Table 1. The evaluation tests were conducted at 25° C. and 60% RH.

| Ink A: | |
|---|---|
| C.I. Direct Yellow 86 | 2 parts |
| Compound of the formula (1-1) | 17 parts |
| Water | 81 parts. |

| Ink B: | |
|---|---|
| C.I. Acid Red 35 | 2 parts |
| Compound of the formula (1-1) | 8 parts |
| Glycerol | 4 parts |
| Water | 86 parts. |

| Ink C: | |
|---|---|
| C.I. Food Black 2 | 3 parts |
| Triethylene glycol | 6 parts |
| Compound of the formula (1-2) | 6 parts |
| Ethanol | 3 parts |
| Water | 82 parts. |

| Ink D: | |
|---|---|
| C.I. Direct Blue 199 | 2.5 parts |
| Diethylene glycol | 5 parts |
| Compound of the formula (1-1) | 9 parts |
| n-Butanol | 2 parts |
| Water | 81.5 parts. |

| Ink E: | |
|---|---|
| C.I. Direct Black 154 | 2 parts |
| Compound of the formula (1-3) | 8 parts |
| Thiodiglycol | 4 parts |
| Diethylene glycol | 2 parts |
| Ethanol | 2 parts |
| Water | 82 parts. |

Comparative Examples 1 to 5

Their corresponding components as described below were treated in the same manner as in Examples 1 to 5 to obtain Inks F to J according to Comparative Examples 1 to 5, respectively. These inks were similarly evaluated in the same items as those in Examples 1 to 5. The results are shown in Table 2.

| Ink F: | |
|---|---|
| C.I. Direct Yellow 86 | 2 parts |
| Glycerol | 17 parts |
| Water | 81 parts. |

| Ink G: | |
|---|---|
| C.I. Food Black 2 | 3 parts |
| Triethylene glycol | 12 parts |
| Ethanol | 3 parts |
| Water | 82 parts. |

| Ink H: | |
|---|---|
| C.I. Direct Blue 199 | 2.5 parts |
| Diethylene glycol | 14 parts |
| n-Butanol | 2 parts |
| Water | 81.5 parts. |

| Ink I: | |
|---|---|
| C.I. Direct Black 154 | 2 parts |
| PEG300 | 14 parts |
| Nonionic surfactant (Nissan Nonion P223, trade name, product of Nippon Oil & Fats Co., Ltd.) | 0.5 part |
| Water | 83.5 parts. |

| Ink J: | |
|---|---|
| C.I. Food Black 2 | 3 parts |
| Ethylene glycol | 15 parts |
| Isopropyl alcohol | 2 parts |
| Water | 80 parts. |

TABLE 1

| Example | 1 | 2 | 3 | 4 | 5 |
|---|---|---|---|---|---|
| Ink | A | B | C | D | E |
| Fixing(*1) characteristics | | | | | |
| Paper for copying | A | A | A | AA | AA |
| Bond paper | AA | AA | AA | AA | AA |
| Percent occurrence of feathering(*2) | | | | | |
| Paper for copying | A | A | A | A | A |
| Bond paper | A | A | A | A | A |
| Clogging tendency after(*3) temporary suspension of printing | A | A | A | A | A |
| Clogging tendency after(*4) long-term suspension of printing | A | A | A | A | A |
| Frequency responsiveness(*5) | AA | AA | AA | AA | AA |

TABLE 2

| Comp. Example | 1 | 2 | 3 | 4 | 5 |
|---|---|---|---|---|---|
| Ink | F | G | H | I | J |

TABLE 2-continued

| Comp. Example | 1 | 2 | 3 | 4 | 5 |
|---|---|---|---|---|---|
| Fixing(*1) characteristics | | | | | |
| Paper for copying | C | B | B | AA | C |
| Bond paper | C | A | B | AA | B |
| Percent occurrence of feathering(*2) | | | | | |
| Paper for copying | A | C | C | C | A |
| Bond paper | A | C | B | C | A |
| Clogging tendency after(*3) temporary suspension of printing | C | B | B | C | C |
| Clogging tendency after(*4) long-term suspension of printing | A | B | C | B | C |
| Frequency responsiveness(*5) | C | B | B | B | C |

(*1) Evaluation of fixing characteristics:
The fixing characteristics were evaluated by rubbing a printed area with filter paper (No. 5 C, trade name, product of Toyo Filter Paper K.K.) upon elapsed time of 10 and 30 seconds, respectiveily, after printing on commercially-available paper for copying and bond paper, and ranked in accordance with the following standard:
AA: No blur was recognized upon rubbing after 10 seconds;
A: Blur was slightly recognized upon rubbing after 10 seconds;
B: Blur was slightly recognized upon rubbing after 30 seconds; and
C: Blur was greatly recognized upon rubbing after 30 seconds.
(*2) Percent occurrence of feathering:
Three hundred dots were continuously printed by the printer on commercially-available paper for copying and bond paper so as not to overlap one another. After the thus-obtained print sample was left standing for at least 1 hour, the number of dots on which irregular feathering occurred was counted through a microscope to rank the resistance to feathering in terms of percent occurrence of feathering in accordance with the following standard:
A: Not higher than 10%;
B: 11 to 30%; and
C: Not lower than 31%.
(*3) Clogging tendency upon resumption of printing after temporary suspension:
The clogging tendency upon resumption of printing after temporary suspension was evaluated by charging an ink to be tested into the printer to continuously print English characters and numerals for 10 minutes, stopping the printer for 2 minutes, and then printing English characters and numerals again, thereby determining whether defective printed areas such as blurred and/or defective characters were observed to rank the anti-fogging property of the ink in accordance with the following standard:
A: No defective printed areas were observed from the first character;
B: The first character was partly blurred or defected; and
C: No printing could be conducted from the first character.
(*4) Clogging tendency upon resumption of printing after long-term suspension (recovery property from clogging):
After an ink to be tested was charged in the printer to continuously print English characters and numerals for 10 minutes, the printer was stopped and left standing for 7 days without capping the head. After conducting a recovery operation from clogging of orifices, English characters and numerals were printed again to determine whether a normal printing state free of blurred and/or defective characters could be reproduced or not, thereby ranking the clogging tendency of the ink in terms of the number of recovery operations required to reproduce the normal printing state in accordance with the following standard (left over at 60° C. and 10 ± 5% RH):
A: Normal printing state was recovered by conducting recovery operation 1 to 5 times;
B: Normal printing state was recovered by conducting recovery operation 6 to 10 times; and
C: Normal printing state was recovered by conducting recovery operation at least 11 times.
(*5) Frequency responsiveness:
The resulting print sample was observed by naked eyes with respect to its printing conditions, namely, conditions of blurred characters and blank areas, and defective ink-droplet impact such as splash and slippage to evaluate the ink in the frequency responsiveness by ranking the conditions in accordance with the following standard:
AA: The follow-up condition of the ink to the frequency responsiveness test was good, and no blurred characters, blank areas or defective ink-droplet impact was observed upon either solid printing and printing of characters;
A: The follow-up condition of the ink to the frequency responsiveness test was substantially good, and no blurred characters, blank areas or defective ink-droplet impact was observed upon printing of characters, but blur was slightly recognized upon solid printing;
B: No blurred characters or blank areas were observed, but defective ink-droplet impact was partly recognized upon printing of characters, and upon solid printing, blur and blank areas were observed at portions of about one-third of the whole solid printed area; and
C: Blur and blank areas were observed to a great extent upon solid printing, and blurred characters and defective ink-droplet impact were also recognized to a large extent even upon printing of characters.

EXAMPLES 6

| Ink K: | |
|---|---|
| C.I. Reactive Red 226 | 6 parts |
| Diethylene glycol | 6 parts |
| Compound of the formula (1-1) | 14 parts |
| Water | 74 parts. |

The above components were mixed, and the resulting mixture was filtered in the same manner as in Examples 1 to 5, thereby obtaining Ink K according to Example 6 of the present invention.

Using the thus-obtained Ink K, a pattern was printed on 100% cotton Georgette crepe, which had been subjected to an alkali pretreatment, by means of the same ink-jet recording apparatus as that used in Examples 1 to 5. The thus-printed fabric was then subjected to a steaming treatment at 100° C. for 3 minutes, washing with water and drying in that order. As a result, a red-colored sharp and bright print was obtained.

EXAMPLES 7 to 13

Their corresponding components as described below were treated in the same manner as in Examples 1 to 5 to obtain Inks L, L', M, N, O, P and P' according to Examples 7 to 13, respectively. These inks were similarly evaluated in the same items as those in Examples 1 to 5. The results are shown in Table 3.

| Ink L: | |
|---|---|
| C.I. Direct Yellow 86 | 2 parts |
| Bis(2-hydroxyethyl)sulfone | 9 parts |
| Water | 89 parts. |
| Ink L': | |
| C.I. Direct Yellow 86 | 2 parts |
| Bis(2-hydroxyethyl)sulfone | 34 parts |
| Water | 64 parts. |
| Ink M: | |
| C.I. Acid Red 35 | 2 parts |
| Bis(2-hydroxyethyl)sulfone | 8 parts |
| Glycerol | 5 parts |
| Water | 85 parts. |
| Ink N: | |
| C.I. Food Black 2 | 3 parts |
| Triethylene glycol | 6 parts |
| Bis(2-hydroxyethyl)sulfone | 6 parts |
| Ethanol | 3 parts |
| Water | 82 parts. |
| Ink O: | |
| C.I. Direct Blue 199 | 2.5 parts |
| Diethylene glycol | 5 parts |
| Bis(2-hydroxyethyl)sulfone | 9 parts |
| n-Butanol | 2 parts |

-continued

| | |
|---|---|
| Water | 81.5 parts. |

Ink P:

| | |
|---|---|
| C.I. Direct Black 154 | 2 parts |
| Bis(2-hydroxyethyl)sulfone | 7 parts |
| Thiodiglycol | 3 parts |
| Diethylene glycol | 3 parts |
| Ethanol | 2 parts |
| Water | 83 parts. |

Ink P':

| | |
|---|---|
| C.I. Direct Black 154 | 2 parts |
| Bis(2-hydroxyethyl)sulfone | 31 parts |
| Thiodiglycol | 3 parts |
| Diethylene glycol | 3 parts |
| Ethanol | 2 parts |
| Water | 59 parts. |

Comparative Examples 6 to 10

Their corresponding components as described below were treated in the same manner as in Examples 1 to 5 to obtain Inks Q to U according to Comparative Examples 6 to 10, respectively. These inks were similarly evaluated in the same items as those in Examples 1 to 5. The results are shown in Table 4.

Ink Q:

| | |
|---|---|
| C.I. Direct Yellow 86 | 2 parts |
| Glycerol | 16 parts |
| Water | 82 parts. |

Ink R:

| | |
|---|---|
| C.I. Food Black 2 | 3 parts |
| Triethylene glycol | 12 parts |
| Ethanol | 3 parts |
| Water | 82 parts. |

Ink S:

| | |
|---|---|
| C.I. Direct Blue 199 | 2.5 parts |
| Diethylene glycol | 14 parts |
| n-Butanol | 2 parts |
| Water | 81.5 parts. |

Ink T:

| | |
|---|---|
| C.I. Direct Black 154 | 2 parts |
| PEG300 | 14 parts |
| Nonionic surfactant (Nissan Nonion P223, trade name, product of Nippon Oil & Fats Co., Ltd.) | 0.5 part |
| Water | 83.5 parts. |

Ink U:

| | |
|---|---|
| C.I. Food Black 2 | 3 parts |
| Ethylene glycol | 15 parts |
| Isopropyl alcohol | 2 parts |
| Water | 80 parts. |

TABLE 3

| Example | 7 | 8 | 9 | 10 | 11 | 12 | 13 |
|---|---|---|---|---|---|---|---|
| Ink | L | L' | M | N | O | P | P' |
| Fixing[*1] characteristics | | | | | | | |
| Paper for copying | A | B | A | AA | AA | AA | B |
| Bond paper | AA | A | AA | AA | AA | AA | A |
| Percent occurrence of feathering[*2] | | | | | | | |
| Paper for copying | A | B | A | A | A | A | C |
| Bond paper | A | A | A | A | A | A | B |

TABLE 3-continued

| Example | 7 | 8 | 9 | 10 | 11 | 12 | 13 |
|---|---|---|---|---|---|---|---|
| Clogging tendency after[*3] temporary suspension of printing | A | A | A | A | A | A | B |
| Clogging tendency after[*4] long-term suspension of printing | A | A | A | A | A | A | A |
| Frequency responsiveness[*5] | AA | AA | AA | AA | AA | AA | A |

TABLE 4

| Comp. Example | 6 | 7 | 8 | 9 | 10 |
|---|---|---|---|---|---|
| Ink | Q | R | S | T | U |
| Fixing[*1] characteristics | | | | | |
| Paper for copying | C | B | B | AA | C |
| Bond paper | C | A | B | AA | B |
| Percent occurrence of feathering[*2] | | | | | |
| Paper for copying | A | C | C | C | A |
| Bond paper | A | C | B | C | A |
| Clogging tendency after[*3] temporary suspension of printing | C | B | B | C | C |
| Clogging tendency after[*4] long-term suspension of printing | A | B | C | B | C |
| Frequency responsiveness[*5] | C | B | B | B | C |

EXAMPLE 14

Ink V:

| | |
|---|---|
| C.I. Reactive Red 226 | 6 parts |
| Diethylene glycol | 10 parts |
| Bis(2-hydroxyethyl)sulfone | 10 parts |
| Water | 74 parts. |

The above components were mixed, and the resulting mixture was filtered in the same manner as in Examples 1 to 5, thereby obtaining Ink V according to Example 14 of the present invention. Using the thus-obtained Ink K, a pattern was printed on 100% cotton Georgette crepe, which had been subjected to an alkali pretreatment, by means of the same ink-jet recording apparatus as that used in Examples 1 to 5. The thus-printed fabric was then subjected to a steaming treatment at 100° C. for 3 minutes, washing with water and drying in that order. As a result, a red-colored sharp and bright print was obtained.

EXAMPLES 15 to 21

Their corresponding components as described below were thoroughly mixed and dispersed using a sand grinder, and the resultant dispersions were separately filtered through a filter having a pore size of 1 μm, thereby obtaining Inks a, a', b, c, d, e and e' according to Examples 15 to 21 of the present invention, respectively.

Using each of the thus-obtained Inks a to e', printing was performed on 100% polyester fabric, "Tropical", which had been pretreated with an aqueous solution containing sodium alginate and urea, using, as an ink-jet recording apparatus, an Ink-jet Printer BJ130 (trade name, manufactured by Canon Inc.) making good use of a heating element as an ejection-energy source. The thus-printed fabric was then subjected to a coloring treatment (steaming at 180° C. for 8 minutes), a reduction clearing treatment according to the conventional method and drying to evaluate the inks in color depth, clogging tendency upon resumption of printing after temporary suspension, clogging tendency upon resumption of printing after long-term suspension and frequency responsiveness. Besides, the inks were also evaluated in dispersion stability. The results are shown in Table 5. The evaluation tests were conducted at 25° C. and 60% RH.

Ink a:

| | |
|---|---|
| C.I. Disperse Yellow 93 | 6 parts |
| Bis(2-hydroxyethyl)sulfone | 20 parts |
| Condensate of sodium naphthalene-sulfonate and formalin | 1 part |
| Water | 73 parts. |

Ink a':

| | |
|---|---|
| C.I. Disperse Yellow 93 | 6 parts |
| Condensate of sodium naphthalene-sulfonate and formalin | 1 part |
| Bis(2-hydroxyethyl)sulfone | 40 parts |
| Water | 53 parts. |

Ink b:

| | |
|---|---|
| C.I. Disperse Red 92 | 7 parts |
| Bis(2-hydroxyethyl)sulfone | 10 parts |
| Thiodiglycol | 10 parts |
| Condensate of sodium naphthalene-sulfonate and formalin | 1 part |
| Water | 72 parts. |

Ink c:

| | |
|---|---|
| C.I. Solvent Black 3 | 6 parts |
| Condensate of sodium naphthalene-sulfonate and formalin | 1 part |
| Triethylene glycol | 6 parts |
| Compound of the formula (1-2) | 6 parts |
| Ethanol | 3 parts |
| Water | 78 parts. |

Ink d:

| | |
|---|---|
| C.I. Disperse Blue 87 | 7 parts |
| Sodium lignosulfonate | 1 part |
| Diethylene glycol | 5 parts |
| Bis(2-hydroxyethyl)sulfone | 9 parts |
| n-butanol | 2 parts |
| Water | 76 parts. |

Ink e:

| | |
|---|---|
| C.I. Disperse Black 39 | 7 parts |
| Sodium lignosulfonate | 1 part |
| Compound of the formula (1-2) | 8 parts |
| Thiodiglycol | 4 parts |
| Diethylene glycol | 2 parts |
| Ethanol | 2 parts |
| Water | 76 parts. |

Ink e':

| | |
|---|---|
| C.I. Disperse Black 39 | 7 parts |
| Sodium lignosulfonate | 1 part |
| Compound of the formula (1-3) | 41 parts |
| Thiodiglycol | 4 parts |
| Diethylene glycol | 2 parts |
| Ethanol | 2 parts |
| Water | 43 parts. |

Comparative Examples 11 to 15

Their corresponding components as described below were treated in the same manner as in Examples 15 to 21 to obtain Inks f to j according to Comparative Examples 11 to 15, respectively. These inks were similarly evaluated in the same items as those in Examples 15 to 21. The results are shown in Table 6.

Ink f:

| | |
|---|---|
| C.I. Disperse Yellow 93 | 6 parts |
| Condensate of sodium naphthalene-sulfonate and formalin | 1 part |
| Glycerol | 17 parts |
| Water | 76 parts. |

Ink g:

| | |
|---|---|
| C.I. Solvent Black 3 | 6 parts |
| Condensate of sodium naphthalene-sulfonate and formalin | 1 part |
| Triethylene glycol | 12 parts |
| Ethanol | 3 parts |
| Water | 78 parts. |

Ink h:

| | |
|---|---|
| C.I. Disperse Blue 87 | 7 parts |
| Sodium lignosulfonate | 1 part |
| Diethylene glycol | 14 parts |
| n-butanol | 2 parts |
| Water | 76 parts. |

Ink i:

| | |
|---|---|
| C.I. Disperse Black 39 | 7 parts |
| Sodium lignosulfonate | 1 part |
| PEG300 | 14 parts |
| Nonionic surfactant (Nissan Nonion P223, trade name, product of Nippon Oil & Fats Co., Ltd.) | 0.5 part |
| Water | 77.5 parts. |

Ink j:

| | |
|---|---|
| C.I. Solvent Black 3 | 6 parts |
| Sodium lignosulfonate | 1 part |
| Ethylene glycol | 15 parts |
| Isopropyl alcohol | 2 parts |
| Water | 76 parts. |

TABLE 5

| Example | 15 | 16 | 17 | 18 | 19 | 20 | 21 |
|---|---|---|---|---|---|---|---|
| Ink | a | a' | b | c | d | e | e' |
| Color depth(*6) Polyester (Tropical) | AA | A | A | B | AA | A | B |
| Dispersion stability(*7) | A | A | A | B | A | B | B |
| Clogging tendency after(*3) temporary suspension of printing | A | B | A | A | A | A | B |
| Clogging tendency after(*4) long-term suspension of printing | A | A | A | A | A | A | A |
| Frequency responsiveness(*5) | AA | A | AA | A | AA | AA | A |

TABLE 6

| Comp. Example | | 11 | 12 | 13 | 14 | 15 |
|---|---|---|---|---|---|---|
| Ink | | f | g | h | i | j |
| Color depth(*6) | Polyester (Tropical) | B | C | A | B | C |
| Dispersion stability(*7) | | C | C | C | C | C |
| Clogging tendency after(*3) temporary suspension of printing | | C | C | C | C | C |
| Clogging tendency after(*4) long-term suspension of printing | | C | C | C | C | C |

TABLE 6-continued

| Comp. Example | 11 | 12 | 13 | 14 | 15 |
|---|---|---|---|---|---|
| Ink | f | g | h | i | j |
| Frequency responsiveness[*5] | C | C | C | C | C |

[*6] Evaluation of color depth:
After printing was conducted on 100% polyester fabric, "Tropical", which had been padded with an aqueous solution containing 1% of sodium alginate and 10% of urea and dried (pickup: 70%), the thus-printed fabric was treated in an HT steamer at 180° C. for 8 minutes and then subjected to a reduction clearing treatment with a solution containing hydrosulfite. The thus-treated fabric was further washed with water and then dried. The color depth of the thus-obtained print sample was then determined in terms of a K/S value found in accordance with the following equation, and ranked in accordance with the following standard.
$K/S = (1 - R)^2/2R$ (R: reflectance at a maximum absorption wavelength)
Incidentally, K and S mean a diffusion coefficient and a scattering coefficient, respectively.
AA: $12 \leq K/S$;
A: $9 \leq K/S < 11$;
B: $5 \leq K/S < 9$; and
C: $5 > K/S$.
[*7] Dispersion stability:
An ink sample was placed in a glass bottle to determine by naked eyes whether or not precipitate was generated in the glass bottle, whereby the dispersion stability was ranked in accordance with the following standard (evaluated under conditions that the sample was left standing for 1 month at 25° C. in the bottle):
A: No precipitate was generated;
B: Precipitate was generated a little; and
C: Precipitate was greatly generated.
Incidentally, the evaluation as to [*3], [*4] and [*5] was conducted in the same manner as in Examples 1 to 5.

According to the present invention, as described above, there can be conducted recording or printing with good frequency responsiveness, free of feathering even on common plain paper such as paper for copying, paper for reporting, notepaper and letter paper, which are commonly used in offices, and on cloth, excellent in image quality and good in penetrability.

Also, the present invention permits the provision of inks having a high safety even when used in offices and homes.

Further, the present invention permits recording or printing high in reliability without causing clogging at orifices of an ink-jet recording head.

Still furthermore, the use of the inks according to the present invention permits the provision of instruments high in reliability.

Yet still further, the present invention permits the provision of inks good in frequency responsiveness and storage stability. Printing with such an ink on cloth can provide a print high in color depth.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink comprising a coloring material and a liquid medium dissolving or dispersing the coloring material therein, wherein the ink comprises a compound represented by the general formula

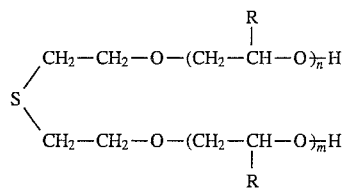

wherein R denotes H or $CH_3$, n is an integer of 1 to 3, m is an integer of 1 to 3, and n+m is within a range of from 2 to 4, in an amount of from 0.1 to 30% by weight based on the total weight of the ink.

2. The ink according to claim 1, wherein the compound of the formula [1] is contained in an amount of from 0.1 to 25% by weight based on the total weight of the ink.

3. The ink according to claim 1, wherein the compound of the formula [1] is contained in an amount of from 1 to 20% by weight based on the total weight of the ink.

4. The ink according to claim 1, wherein the compound of the formula [1] is selected from the group consisting of compounds of the formulae

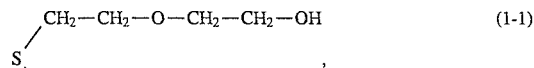

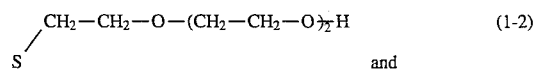

and

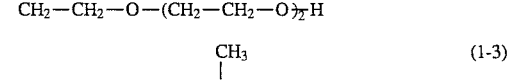

5. The ink according to claim 1, wherein the coloring material is a water-soluble dye or a water-insoluble dye.

6. The ink according to claim 1, wherein the coloring material is contained in an amount of from 0.2 to 25% by weight based on the total weight of the ink.

7. The ink according to claim 1, wherein water is contained as a liquid medium.

8. The ink according to claim 7, wherein the content of water falls within a range of from 50 to 95% by weight based on the total weight of the ink.

9. The ink according to claim 1, wherein at least one water-soluble organic solvent is contained as a liquid medium.

10. The ink according to claim 9, wherein the content of water-soluble organic solvent falls within a range of from 1 to 49% by weight based on the total weight of the ink.

11. An ink-jet recording method comprising ejecting droplets of an ink out of an orifice in accordance with a recording signal to conduct recording on a recording medium, wherein the ink according to any one of claims 1 to 10 is used.

12. The ink-jet recording method according to claim 11, wherein the recording medium is coated paper or cloth.

13. The ink-jet recording method according to claim 11, wherein the ink droplets are ejected by applying thermal energy to the ink.

14. A recording unit comprising an ink container portion with an ink held therein and a head from which the ink is ejected in the form of ink droplets, wherein said ink is the ink according to any one of claims 1 to 10.

15. The recording unit according to claim 14, wherein the ink container portion is formed of polyurethane.

16. The recording unit according to claim 14, wherein the head is a head which applies thermal energy to the ink to eject the ink in the form of droplets.

17. An ink cartridge comprising an ink container portion with an ink held therein, wherein said ink is the ink according to any one of claims 1 to 10.

18. The ink cartridge according to claim 17, wherein the ink container portion is made of a polyolefin at its surface which contacts the ink.

19. An ink-jet recording apparatus comprising a recording unit having an ink container portion with an ink held therein and a head from which the ink is ejected in the form of ink droplets, wherein said ink is the ink according to any one of claims 1 to 10.

20. The ink-jet recording apparatus according to claim 19, wherein the ink container portion is formed of polyurethane.

21. The ink-jet recording apparatus according to claim 19 wherein the head is a head which applies thermal energy to the ink to eject the ink in the form of droplets.

22. An ink-jet recording apparatus comprising a recording head from which an ink is ejected in the form of ink droplets, an ink cartridge having an ink container portion with the ink held therein, and an ink feeder for feeding the ink from the ink cartridge to the recording head, wherein said ink is the ink according to any one of claims 1 to 10.

23. The ink-jet recording apparatus according to claim 22, wherein the ink container portion is made of a polyolefin at its surface which contacts the ink.

24. The ink-jet recording apparatus according to claim 22, wherein the head is a head which applies thermal energy to the ink to eject the ink in the form of droplets.

25. A textile printing method comprising ejecting droplets of an ink out of an orifice in accordance with a recording signal to conduct printing on a cloth and then subjecting the cloth to a coloring treatment, wherein the ink according to any one of claims 1 to 10 is used.

26. The textile printing method according to claim 25, wherein the cloth is a cloth comprising principally polyester, rayon or acrylic fibers.

27. An ink comprising a water-insoluble coloring material and a liquid medium dispersing the coloring material therein,
wherein the ink comprises bis(2-hydroxyethyl)sulfone in an amount of from 0.1 to 30% by weight based on the total weight of the ink.

28. The ink according to claim 27, wherein the water-insoluble coloring material is a disperse dye.

29. The ink according to claim 27, wherein the water-insoluble coloring material is contained in an amount of from 0.2 to 20% by weight based on the total weight of the ink.

30. The ink according to claim 27, wherein bis(2-hydroxyethyl)sulfone is contained in an amount of from 1 to 25% by weight based on the total weight of the ink.

31. The ink according to claim 27, wherein bis(2-hydroxyethyl)sulfone is contained in an amount of from 1 to 20% by weight based on the total weight of the ink.

32. The ink according to claim 27, wherein water is contained as a liquid medium.

33. The ink according to claim 27, wherein the content of water falls within a range of from 50 to 95% by weight based on the total weight of the ink.

34. The ink according to claim 27, wherein at least one water-soluble organic solvent is contained as a liquid medium.

35. The ink according to claim 34, wherein the content of water-soluble organic solvent falls within a range of from 1 to 49% by weight based on the total weight of the ink.

36. An ink-jet recording method comprising ejecting droplets of an ink out of an orifice in accordance with a recording signal to conduct recording on a recording medium, wherein the ink according to any one of claims 29, to 35 is used.

37. The ink-jet recording method according to claim 36, wherein the recording medium is coated paper or cloth.

38. The ink-jet recording method according to claim 36, wherein the ink droplets are ejected by applying thermal energy to the ink.

39. A recording unit comprising an ink container portion with an ink held therein and a head from which the ink is ejected in the form of ink droplets, wherein said ink is the ink according to any one of claims 27 to 35.

40. The recording unit according to claim 39, wherein the ink container portion is formed of polyurethane.

41. The recording unit according to claim 39, wherein the head is a head which applies thermal energy to the ink to eject the ink in the form of droplets.

42. An ink cartridge comprising an ink container portion with an ink held therein, wherein said ink is the ink according to any one of claims 27 to 35.

43. The ink cartridge according to claim 42, wherein the ink container portion is made of a polyolefin at its surface which contacts the ink.

44. An ink-jet recording apparatus comprising a recording unit having an ink container portion with an ink held therein and a head from which the ink is ejected in the form of ink droplets, wherein said ink is the ink according to any one of claims 27 to 35.

45. The ink-jet recording apparatus according to claim 44, wherein the ink container portion is formed of polyurethane.

46. The ink-jet recording apparatus according to claim 44, wherein the head is a head which applies thermal energy to the ink to eject the ink in the form of droplets.

47. An ink-jet recording apparatus comprising a recording head from which an ink is ejected in the form of ink droplets, an ink cartridge having an ink container portion with the ink held therein, and an ink feeder for feeding the ink from the ink cartridge to the recording head, wherein said ink is the ink according to any one of claims 27 to 35.

48. The ink-jet recording apparatus according to claim 47, wherein the ink container portion is made of a polyolefin at its surface which contacts the ink.

49. The ink-jet recording apparatus according to claim 47, wherein the head is a head which applies thermal energy to the ink to eject the ink in the form of droplets.

50. A textile printing method comprising ejecting droplets of an ink out of an orifice in accordance with a recording signal to conduct printing on a cloth and then subjecting the cloth to a coloring treatment, wherein the ink according to any one of claims 27 to 35 is used.

51. The textile printing method according to claim 50, wherein the cloth is a cloth comprising principally polyester, rayon or acrylic fibers.

* * * * *

UNITED STATES PATENT AND TRADEMARK OFFICE
CERTIFICATE OF CORRECTION

PATENT NO. : 5,540,764  Page 1 of 2
DATED : July 30, 1996
INVENTOR(S) : Masahiro HARUTA, et al.

It is certified that error appears in the above-indentified patent and that said Letters Patent is hereby corrected as shown below:

Title page, item
[56] References Cited

U.S. PATENT DOCUMENTS

"4,585,484    4/1985    Haruta et al." should read
--4,585,484   4/1986    Haruta et al.--

COLUMN 4

Line 55, "is" should read --is a--.

COLUMN 6

Line 40, "40" should read --40%--.

COLUMN 7

Line 28, "17-" should read --17-1--.

COLUMN 9

Line 27, "Al" should read --A--.

UNITED STATES PATENT AND TRADEMARK OFFICE
CERTIFICATE OF CORRECTION

PATENT NO. : 5,540,764
DATED : July 30, 1996
INVENTOR(S) : Masahiro HARUTA, et al.

It is certified that error appears in the above-indentified patent and that said Letters Patent is hereby corrected as shown below:

COLUMN 19

Line 19, "claim 19" should read --claim 19,--.
    Line 62, "claim 27," should read --claim 32,--.

COLUMN 20

Line 10, "claims 29," should read --claims 27--.

Signed and Sealed this

Nineteenth Day of November, 1996

Attest:

BRUCE LEHMAN

*Attesting Officer*      *Commissioner of Patents and Trademarks*